UNITED STATES PATENT OFFICE.

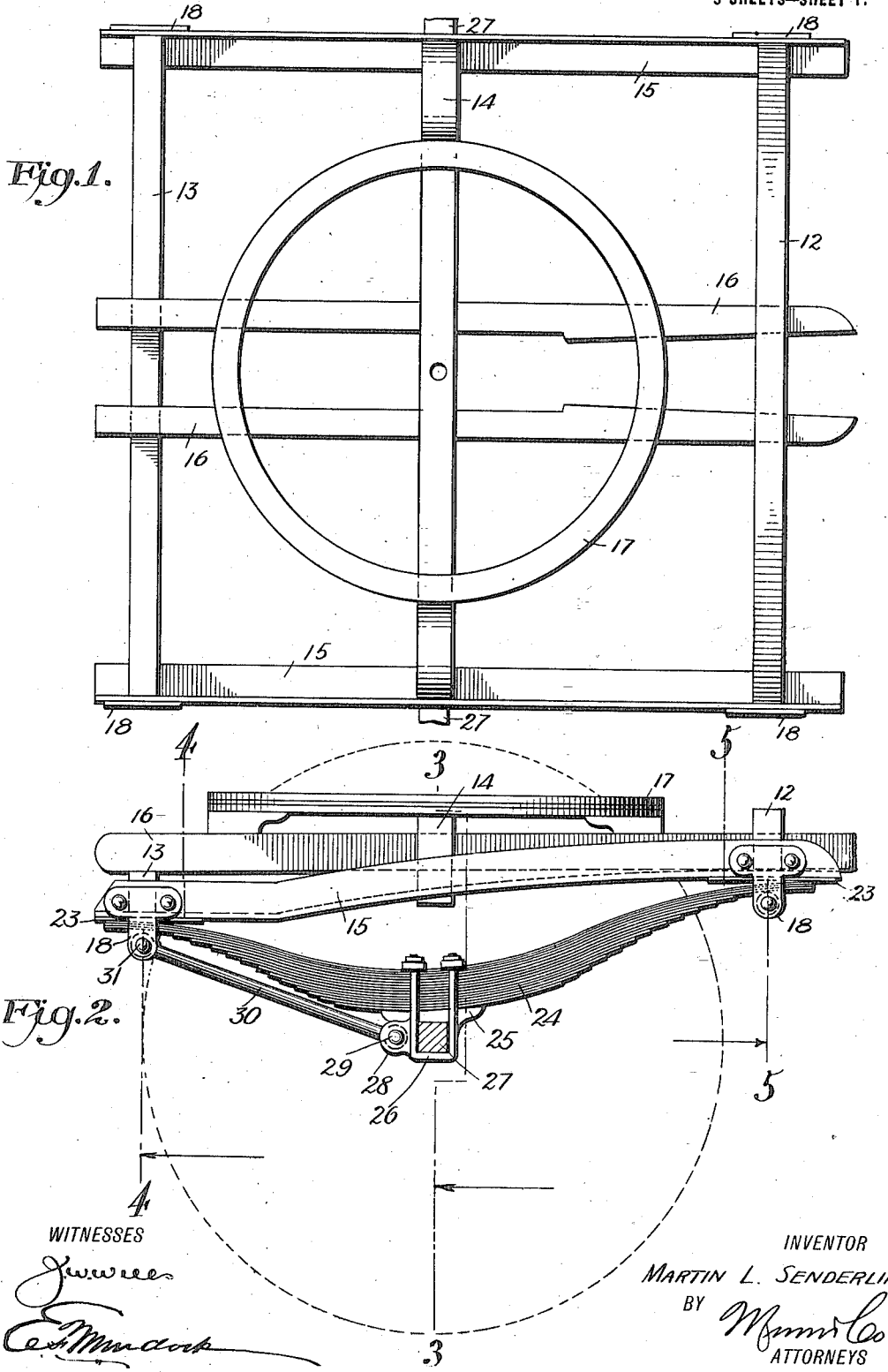

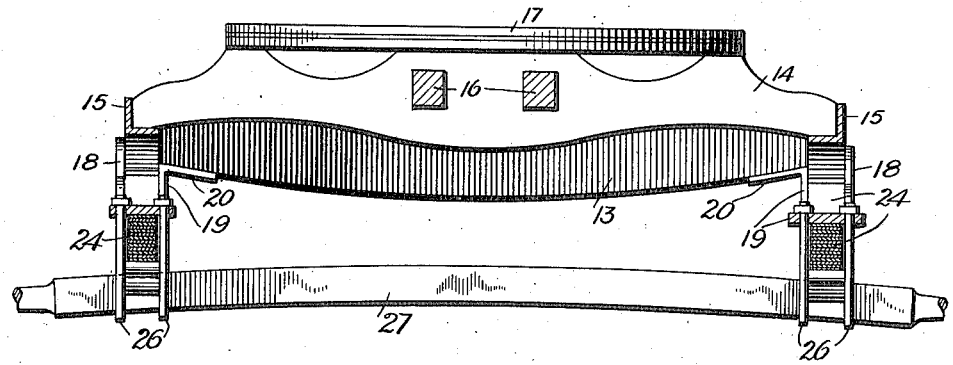
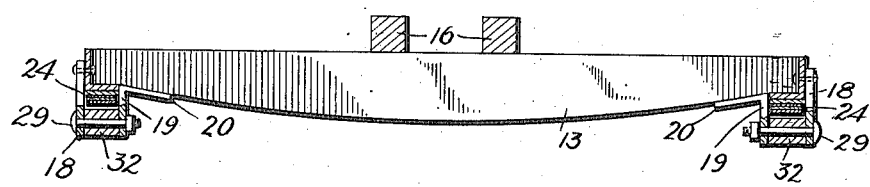
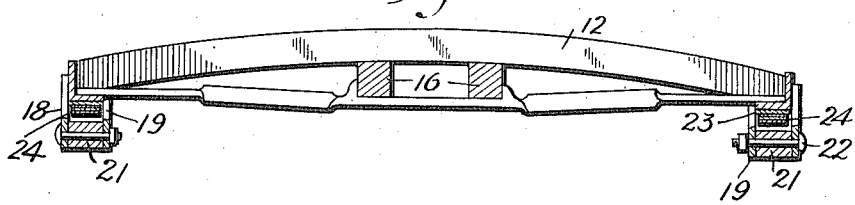

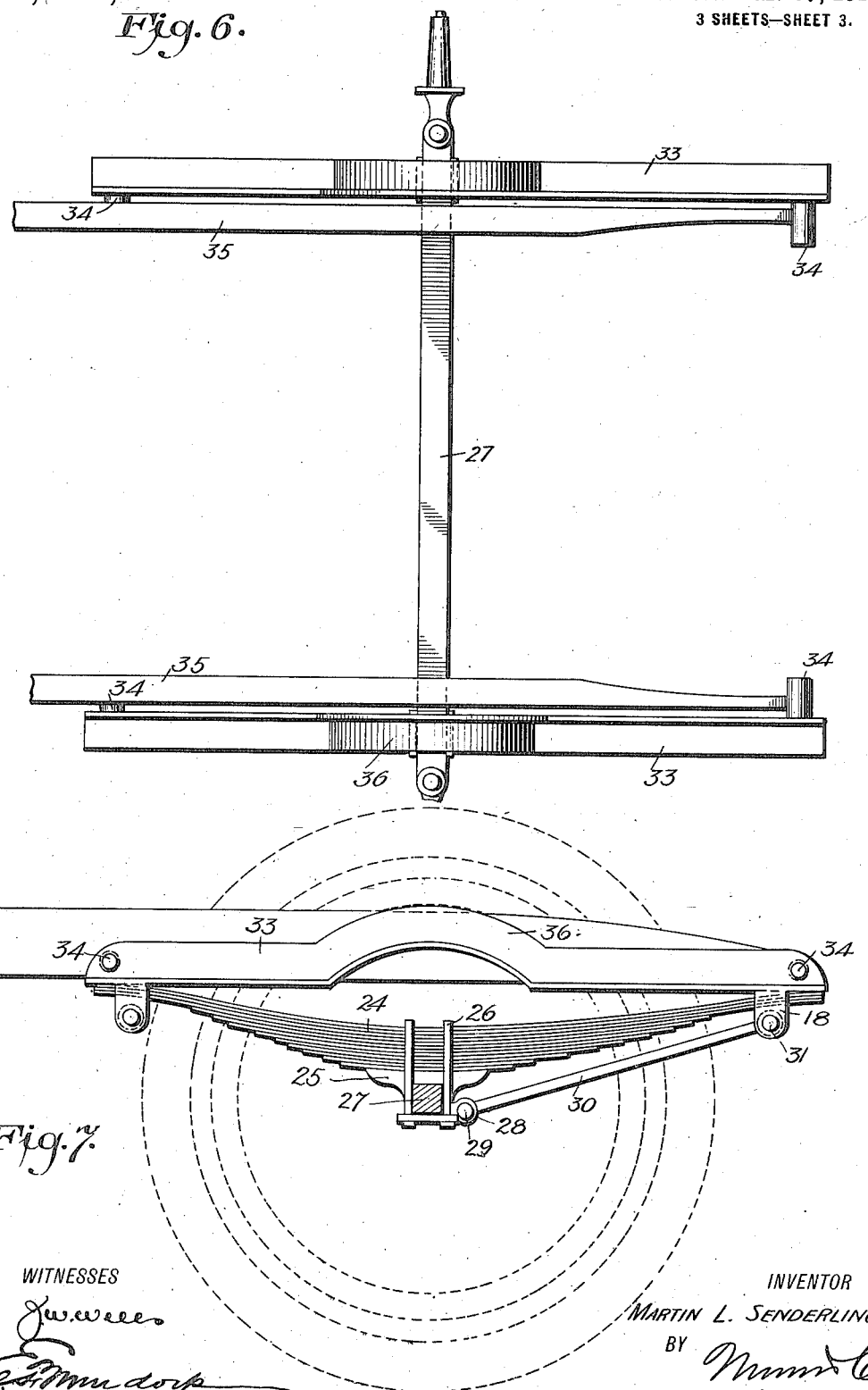

MARTIN L. SENDERLING, OF JERSEY CITY, NEW JERSEY.

VEHICLE-BAR-SPRING UNIT.

1,220,791. Specification of Letters Patent. Patented Mar. 27, 1917.

Application filed March 18, 1914, Serial No. 825,530. Renewed October 7, 1915. Serial No. 54,691.

*To all whom it may concern:*

Be it known that I, MARTIN L. SENDERLING, a citizen of the United States, and a resident of Jersey City, in the county of Hudson and State of New Jersey, have invented a new and Improved Vehicle-Bar-Spring Unit, of which the following is a full, clear, and exact description.

Among the principal objects which the present invention has in view are: to provide means for installing the improved springs and mountings therefor on a relatively light structure, and to provide a spring unit removably attachable to a vehicle.

Drawings.

Figure 1 is a top plan view of a truck frame constructed and arranged in accordance with the present invention;

Fig. 2 is a side view of the same, indicating in dotted lines in conjunction therewith a carrying wheel for said truck;

Fig. 3 is a vertical section taken on the line 3—3 in Fig. 2;

Fig. 4 is a vertical section taken on the line 4—4 in Fig. 2;

Fig. 5 is a vertical section taken on the line 5—5 in Fig. 2;

Fig. 6 is a top plan view showing a modified form of the invention, whereby the same is applied to a relatively light structure;

Fig. 7 is a side elevation of the same.

In the present invention, the splinter bar 12, the spring bar 13, and the center block 14 are elongated to extend above the carrying spring and to be securely mounted in the angle of the side bars 15. The side bars 15 in the preferred construction are substituted for the ordinary side bars, and are shaped substantially as shown in Fig. 2 of the drawings to register with the ends of said bars.

The hounds 16 are of conventional form, being passed through the center block 14 and below and above the splinter bar and spring bar, respectively, the object being to form in conjunction with the center block a level rest for the fifth-wheel 17.

At the ends of the side bars 15 are pendent shackle or guide plates 18 and 19. The shackle plates 19 have each an extension 20, bent at an angle to rest under and to be pressed against the bottom edges of the splinter and spring bars. Between the shackle plates are spacing blocks 21, held in position and clamped by the bolts 22 and fastening nuts applied thereto.

Suitably mounted under the ends of each of the side bars 15 and between the shackle plates 18 and 19 are wear plates 23. It is against these plates that the uppermost leaf of the springs 24 rests. The springs 24 are mounted upon a saddle block 25, being held thereon by stirrup bolts 26, which encompass an axle 27. The bolts 26 are preferably each provided with a hinge wing 28, through which a bolt 29 passes, said bolt serving as a pivot and retention member for spacing rods 30, with which the present equipment is provided. At the rear end of the rods 30 a similar office is performed by pivot bolts 31, which pass through the heads 32 of said rods, and through perforations formed in the shackle plates 18 and 19 mounted on the spring bar 13.

When thus constructed and arranged, the springs 24 are free to slide on the wear plates 23 above the blocks 21 in front, and at the rear between said plates and the heads 32 of the spacing rods 30. The result of this construction and arrangement is that when the load is impressed upon the springs, the free ends thereof slide over the wear plates 23 and flatten thereon. It will be seen that as the springs thus flatten, the points of bearing of said springs move toward the center thereof, or toward the axle on which said springs are mounted. The effect of this action is to shorten or condense the active sections of the springs, and to move from the thin, flexible ends of said springs to the thicker and less flexible sections thereof. In speaking of the springs, it will be understood that full recognition is given to the fact that the springs are constructed of laminated leaves shaped and arranged as in the conventional models.

It will be understood that as the springs 24 are controlled by the rods 30 to travel a defined path, the ends of the springs, and particularly the forward ends, are compelled to slide on the wear plates 23. The frictional resistance afforded by the plates to the movement of the springs serves to retard or quiet the action thereof. It will also be observed that as the springs recoil or react, the friction referred to is further accounted for by resisting the readjustment of the spring to its original shape, serving thereby to hold or retard the return and so overcome any tendency to slash or violently react, which action is accountable for many of the disastrous results to springs of this character. Due to the construction wherein the spacing rods 30 are definitely positioned behind the axles 27 to which they are connected, said axles and the springs 24 connected therewith are relatively moved toward the front ends of the side bars 15.

In Figs. 6 and 7, the side bars 33 are extended by means of bolts 34, laterally from the side bars 35 with which the conventional chassis of an automobile is furnished. The side bars 33 are each provided with a central bowed section 36, arranged to clear the knuckle or structural element connected with the axle 27, and members connected therewith. The bars 33 are preferably connected with the axle 27 by the spacing rods 30, these being preferably connected with the shackle plates 18 and 19 at the forward end of the truck. As a result of this arrangement, the wheels of the automobile carry the body of said automobile more easily than when the rods are disposed in the opposite arrangement.

The spacing rods 30 are arranged in front of, or at the rear of the axle to which they are attached, in accordance with the work performed by the wheel mounted on said axle. If the wheel is a traction wheel, the spacing rod is disposed at the rear thereof. If the wheel is a trailing wheel, said spacing rod is then disposed in front of the axle.

It will be noted that the bars 33, springs 24, shackle plates 18, saddle block 25 and bolts 26 constitute a unit structure which may be removed from and applied to a vehicle as such. Attention is particularly called to this structure, as it constitutes the peculiar novelty in the present invention.

Claims.

1. A truck as characterized, comprising a plurality of elliptical springs spaced apart and secured in operative position in the usual manner; a plurality of side bars disposed in superposed relation to and in a plane coincident with said springs; a splinter bar rigidly secured to said side bars adjacent one end thereof; a spring bar rigidly secured to the opposite ends of said side bars; a plurality of hounds rigidly secured to said splinter bar and spring bar, said hounds being disposed in parallel relation to said side bars and separated to leave a space coincident with the longitudinal center of said truck; a center block fixedly attached to said side bars and to said hounds, said center block having a king bolt perforation formed therein; and a fifth wheel mounted upon and fixedly connected with said center block and said hounds.

2. A truck as characterized, comprising a plurality of elliptical springs spaced apart and secured in operative position in the usual manner; a plurality of side bars disposed in superposed relation to and in a plane coincident with said springs; a splinter bar rigidly secured to said side bars adjacent one end thereof; a spring bar rigidly secured to the opposite ends of said side bars; a plurality of hounds rigidly secured to said splinter bar and spring bar, said hounds being disposed in parallel relation to said side bars and separated to leave a space coincident with the longitudinal center of said truck; a center block fixedly attached to said side bars and to said hounds, said center block having a king bolt perforation formed therein; a fifth wheel mounted upon and fixedly connected with said center block and said hounds; and spacing rods pivotally connected with said side bars and with the center of said springs to maintain the working relation of said bars and springs.

3. The combination with a vehicle chassis having laterally-extended bracket members; of a unit spring structure embodying a plurality of superimposed semi-elliptical spring leaves; rigid riding bars permanently operatively connected with the ends of said leaves; and means for holding said bars and said ends in service relation and for permitting said ends to vary in correspondence with the pressure on said spring.

4. The combination of a vehicle chassis having laterally extended bracket members and a spring unit comprising lineally extensible spring members; a non-extensible bearing member slidably connected to said spring member adjacent the extreme ends thereof and in supported relation thereto, said bearing member being adapted to progressively shorten the active portion of said spring member in correspondence with the flexure of such spring member in service; and a non-extensible member connecting said spring member and said bearing member to maintain the centers of said members substantially alined.

In testimony whereof I have signed my name to this specification in the presence of two subscribing witnesses.

MARTIN L. SENDERLING.

Witnesses:
E. F. MURDOCK,
PHILIP D. ROLLHAUS.